United States Patent

[11] 3,623,606

| [72] | Inventor | Dale L. Turnidge<br>Route 1, Box 223, Jefferson, Oreg. 97352 |
|---|---|---|
| [21] | Appl. No. | 865,635 |
| [22] | Filed | Oct. 13, 1969 |
| [45] | Patented | Nov. 30, 1971 |

[54] SEPARATOR FOR IMMISCIBLE LIQUIDS
14 Claims, 6 Drawing Figs.

[52] U.S. Cl. .................................................. 210/94,
210/519, 210/540
[51] Int. Cl. .................................................... B01d 21/24
[50] Field of Search .......................................... 210/86, 94,
96, 340

[56] References Cited
UNITED STATES PATENTS

| 603,587 | 5/1898 | Dorn | 210/94 X |
| 654,965 | 7/1900 | Franke | 210/540 X |
| 1,147,881 | 7/1915 | Morris | 210/540 |
| 2,206,835 | 7/1940 | Combs | 210/540 X |
| 2,744,630 | 5/1956 | Hughes | 210/540 |

Primary Examiner—John Adee
Attorney—Oliver D. Olson

ABSTRACT: An inverted trough forms the top of or is housed in a container and is inclined upwardly from its infeed end to its outfeed end. The infeed end of the trough communicates with a source of a mixture of immiscible liquids to be separated, through an infeed conduit assembly which includes a gas bleed and an infeed rate monitor. The outfeed end of the trough communicates within an outfeed conduit for delivering the separated lighter density liquid to storage. A transparent interface-monitoring conduit interconnects the container below the outfeed end of the trough and the outfeed conduit above the outfeed end of the trough, for visual inspection of the interface of the immiscible liquids. A vertically adjustable drain conduit extends from the bottom of the container to an elevation above the trough but below the outlet end of the outfeed conduit, for adjusting the elevation of said interface.

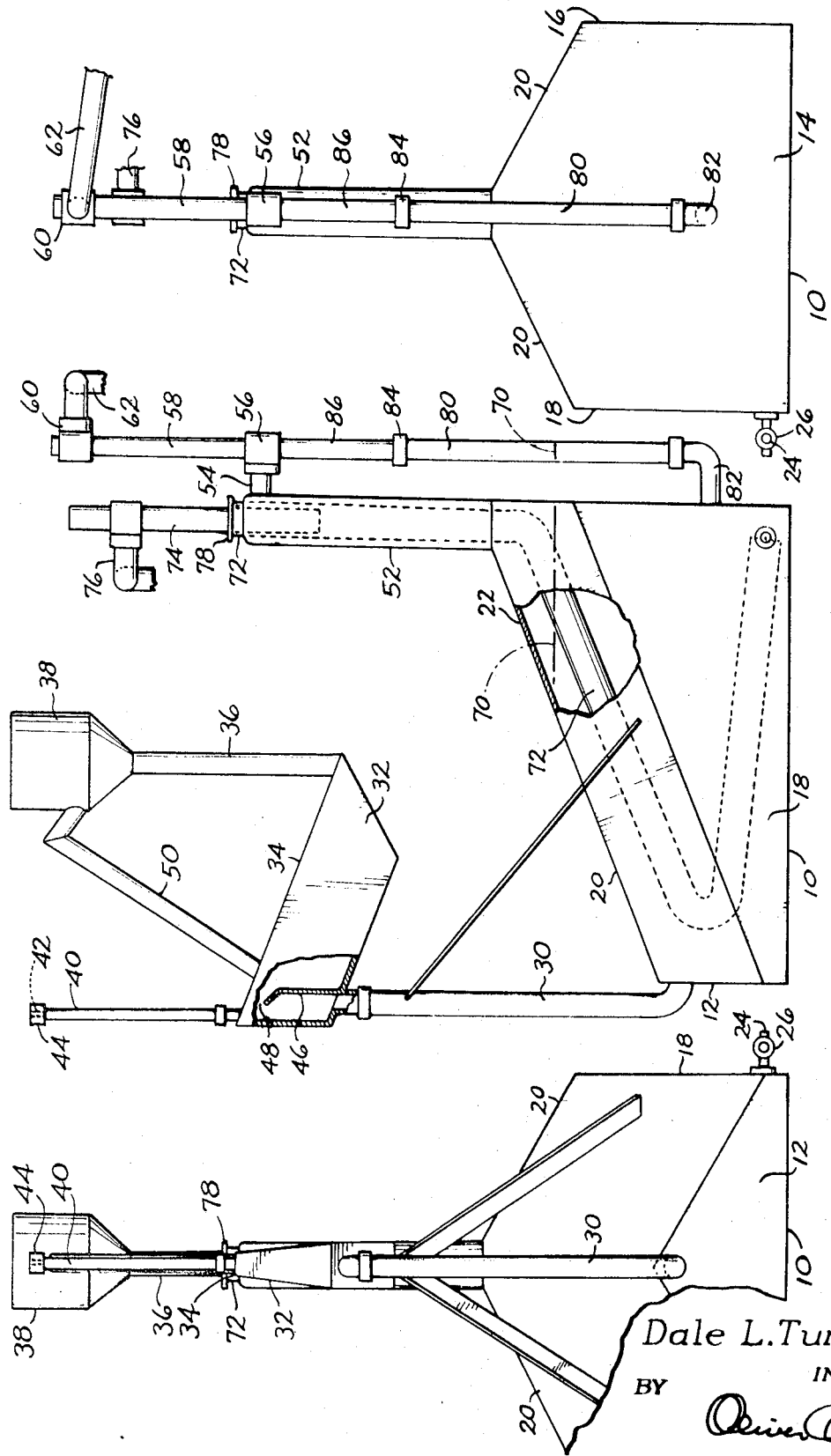

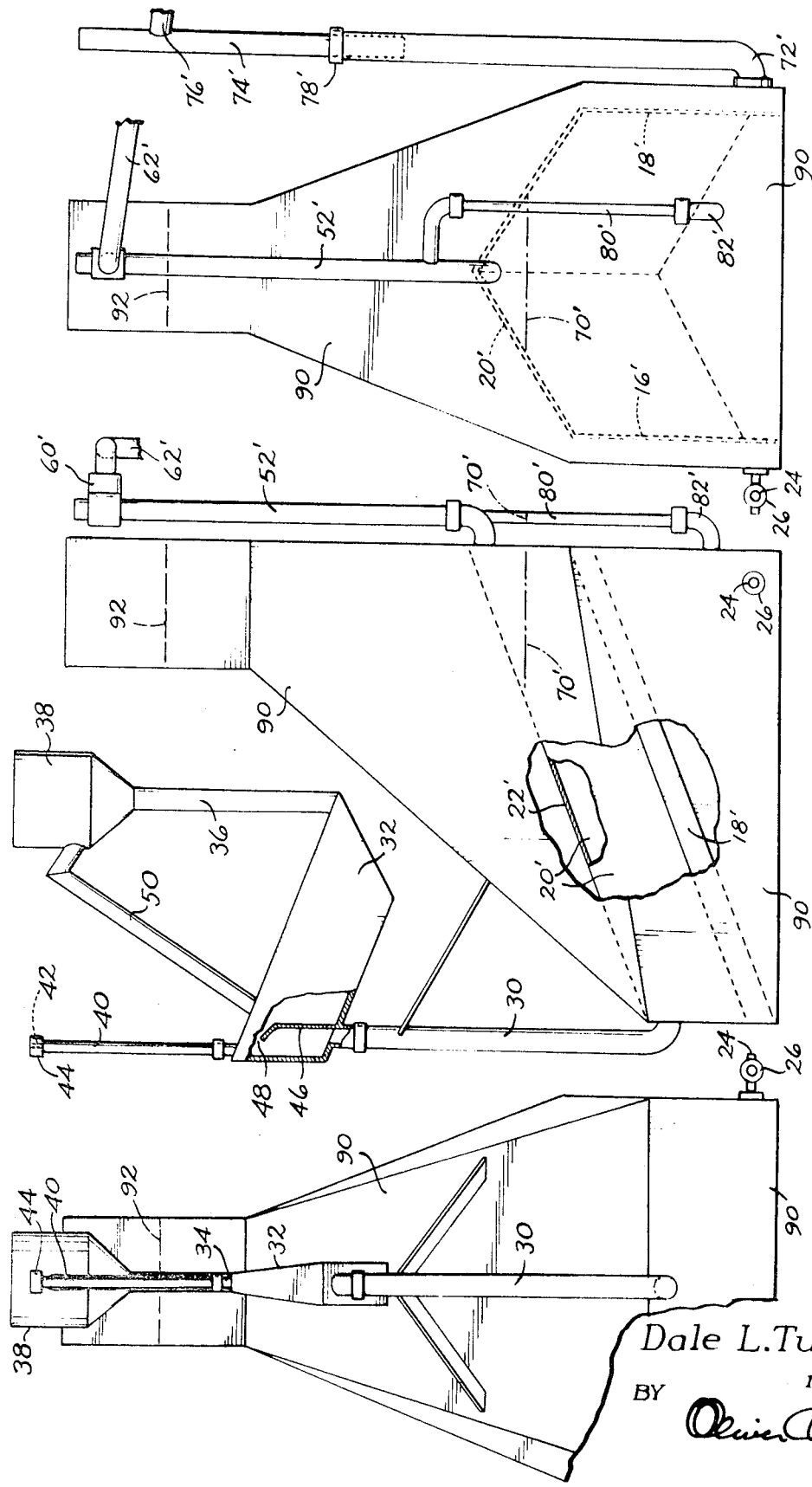

3,623,606

SEPARATOR FOR IMMISCIBLE LIQUIDS

BACKGROUND OF THE INVENTION

This invention relates to apparatus for separating immiscible liquids of different densities, and more particularly to such apparatus for separating essential oils from the steam distillate by which such oils are extracted from their natural sources.

For example, peppermint oil is obtained by steam distillation of the mint plant *Mentha piperita*. The vapors of oil and steam are condensed to liquid form and the resulting mixture of immiscible liquids then is separated to recover the oil.

Various types of apparatus have been employed heretofore for the separation of peppermint and other essential oils from water. In general, they are characterized by certain deficiencies which are reflected in excessive time and poor-quality yield. For example, apparatus which functions merely to collect the distillate mixture and allow gravity separation, with the lighter density oil rising to the top where it is skimmed off, requires excessive manual labor and results in inefficient recovery of oil.

On the other hand, apparatus which functions to separate the oil from the water and deliver the oil automatically to storage, heretofore has resulted in the production of oil containing an excessive amount of water. The procedure for removing the water from the oil is time consuming and annoying to the wholesale purchase of the oil.

Furthermore, it has been difficult with prior apparatus to ascertain the point at which the distillation yield of oil from a batch of mint plant or other source of essential oil becomes economically unfeasible. As a result, distillation sometimes is stopped too soon, resulting in the loss of valuable oil, and sometimes is continued too long, resulting in excessive production costs, and poor quality oil.

SUMMARY OF THE INVENTION

In its basic concept, the separator of the present invention provides efficient collector means for separating the oil from the water and delivering the oil to storage, provides oil level monitoring means by which to insure against loss of oil to the water discharge and dilution of the separated oil with water, and further provides a distillate infeed rate monitor by which to determine the point at which to discontinue distillation.

It is by virtue of the foregoing basic concept that the principal objective of this invention is achieved; namely, to overcome the above-enumerated disadvantages of the various types of prior apparatus.

The foregoing and other objects and advantages of the present invention will appear from the following detailed description, taken in connection with the accompanying drawings of the preferred embodiments.

BRIEF DESCRIPTION OF THE DRAWINGS

FIG. 1 is a side elevation of a separator for immiscible liquids embodying the features of this invention, parts being broken away to disclose details of internal construction.

FIG. 2 is a fragmentary end elevation as viewed from the left in FIG. 1.

FIG. 3 is a fragmentary end elevation as viewed from the right in FIG. 1.

FIGS. 4, 5, and 6 are views similar to FIGS. 1, 2, and 3, respectively, of another form of separator embodying the features of this invention.

DESCRIPTION OF THE PREFERRED EMBODIMENTS

Referring first to the embodiment illustrated in FIGS. 1-3, the separator includes a liquid container formed by the bottom wall 10, front wall 12, rear wall 14 and sidewalls 16 and 18. Associated with the container is a collecting receptacle for collecting the lighter density fraction of the immiscible liquids. In the embodiment illustrated the receptacle is formed by the angular top wall 20 of the container. The angular wall defines apex 22 and forms an inverted trough. As illustrated, the apex of the trough preferably inclines upward from the front wall 12 to the rear wall 14.

The liquid generally is a mixture of oil and water, since the apparatus usually is employed for the separation of essential oils extracted from natural products by steam distillation. However, although the apparatus is described hereinafter with reference to the separation of peppermint oil, it is to be understood that the apparatus also may be employed for the separation of spearmint, dill, parsley, caraway, and various other essential oils from steam distillate, as well as many other admixtures of immiscible liquids.

A drainpipe 24 with shutoff valve 26 is provided adjacent the bottom end of the container for removing the liquid contents thereof when desired.

Infeed means is provided for delivering a mixture of immiscible liquids to the lower end of the collecting trough. In the embodiment illustrated, this infeed means also incorporates means for releasing entrapped air and other volatiles in the liquid mixture, and also means by which to monitor the rate by which peppermint or other oil is being extracted from the natural source by steam distillation.

Thus, the inlet end of an infeed conduit 30 communicates through the front wall 12 of the container with the lower end of the trough 20. The infeed conduit extends vertically upward and its inlet end communicates with the interior of a laterally elongated settling tank 32, adjacent one end of the latter. The end of the tank remote from the infeed conduit communicates through its top wall 34 with the lower end of a liquid delivery conduit 36, the upper end of which communicates with an infeed funnel 38.

The open upper end of the funnel is adapted to receive the mixture of immiscible liquids to be separated. In the case of peppermint oil separation, the funnel receives the liquid mixture discharge from the condenser which functions to condense the vapors of oil and water, as will be understood.

The upper wall 34 of the settling tank inclines upwardly from the delivery conduit 36 to its opposite end at which the infeed conduit 30 is located. Communicating with the interior of the settling tank at the elevated end of the upper wall is an upstanding tube 40 of glass or other transparent material such as polyethylene or other suitable synthetic thermoplastic resin. The upper end of the tubing is open to the atmosphere, preferably through a constricted orifice 42 provided in an end cap 44.

A baffle 46 extends upwardly within the settling tank, between the conduits 30 and 36, to provide a constricted passageway 48 between the upper wall of the tank and the infeed conduit.

A gas bleed conduit 50 communicates at one end with the interior of the settling tank, adjacent the upper end of the top wall 34, and at the opposite end with the atmosphere, conveniently through the infeed funnel 38. Thus, any air or other volatiles entrapped in the liquid within the settling chamber, will gravitate with the flow of liquid upwardly along the inclined upper wall 34 of the tank and thence through the bleed conduit and infeed funnel where it is released to the atmosphere.

It will be apparent that the liquid mixture of peppermint and water that enters the settling tank will flow through the constricted passageway 48 and thence downward through the infeed conduit 30 to the lower end of the collecting trough. As the mixture enters the trough, the lighter density oil fraction gravitates upwardly along the inclined apex 22 to the opposite end of the latter. The heavier water fraction gravitates downward toward the bottom of the container.

Means is provided for conveying to storage the lighter density oil fraction trapped under the upper end of the trough. Thus, the infeed end of an outfeed conduit 52 communicates through the top wall of the container with the interior of the trough adjacent the upper end of the latter. The outfeed conduit extends upwardly and is provided adjacent its closed upper end with a lateral outlet pipe 54 provided with a T-fitting 56. Extending upward from this fitting is an outfeed pipe 58 provided adjacent its open upper end with an outlet fitting 60 to which an elongated discharge pipe 62 is attached. This pipe extends to a collecting barrel (not shown) in which the oil is stored, and it slopes slightly downward to the barrel to provide gravity flow from the outlet fitting.

Means is provided for continuously removing excess water or other heavier fraction of liquid from the container during the separation process and for controlling the level of the interface 70 between the immiscible liquids in the container. In the embodiment illustrated, such means is provided by the longitudinally telescoping overflow pipes 72 and 74. The inlet end of the lower pipe 72 is positioned adjacent the bottom of the container and preferably adjacent the rear wall 14, i.e., below the outfeed conduit 52. The pipe 72 extends from the inlet end toward the front wall 12, thence angularly upward along the apex 22, but spaced therefrom, and thence vertically upward through the outfeed conduit 52. The upper end of conduit 52 and pipe 72 are welded or otherwise secured together with a liquidtight seal.

The upper pipe 74 telescopes within the upper end of the lower pipe 72 and is provided with a lateral discharge pipe 76 adjacent its open upper end for discharging the overflow liquid to a drain. A clamp ring 78 at the upper end of the lower pipe 72 houses an annular seal which provides a liquidtight seal between the telescoping pipes 72 and 74 and functions releasably to secure the upper pipe 74 to the lower pipe in various positions of longitudinal adjustment. By this means the elevation of the discharge pipe 76, and hence the level of the liquid interface 79 in the container, may be adjusted as desired.

In the operation of the separator, it is important to maintain the interface 70 between the water and lighter density oil in the trough below the inlet end of the outfeed conduit 52 and above the inlet end of the overflow pipe 72. If the interface should drop below the inlet end of pipe 72, some of the lighter density oil fraction will be discharged with the overflow water. Although it may be recovered by redistillation, it involves additional time and labor to do so. If the interface 70 should rise above the inlet end of the outfeed conduit 52, water will be drawn through the outfeed conduit and into the oil storage barrel. Removal of the water content then would have to be made by the time-consuming and annoying procedure previously mentioned.

Accordingly, means is provided for monitoring the level of the interface 70 to ensure that it does not exceed the foregoing limits. This means comprises an elongated glass or other transparent tubing 80 which is connected at its lower end to a fitting 82 which, in turn, communicates through the rear wall 14 of the container with the interior of the latter adjacent the bottom thereof. The tubing extends vertically and its upper end is connected to a fitting 84 which, in turn, communicates with a connector pipe 86 extending downward from the T-fitting 56. Thus, the level of the interface 70 within the container also is present within the transparent tubing 80 for visual inspection.

Adjustment of the level of the interface 70 is made as follows: If the interface appears to be too high, approaching the inlet end of the outfeed conduit 52, the clamping collar 78 is loosened and the upper section 74 of the overflow conduit is lowered slightly, to lower the outlet discharge pipe 76 and proportionately lower the level of the interface 70 in the container. Conversely, if the interface appears to be too low, for example a few inches below the preferred level indicated in FIG. 1, the upper section 74 of the overflow conduit is raised.

In the operation of the separator, for separating peppermint oil from the condensate resulting from steam distillation of the mint plant, the container first is filled with water to a preselected maximum level of discharge pipe 76. This level of water also is established in the infeed and outfeed conduits, as will be understood. Condensate then is admitted into the funnel 38 from whence it progresses through the settling tank 32 and infeed conduit 30 to the lower end of the collecting trough 20. The lighter density oil fraction is trapped under the closed top of the trough and gravitates upwardly through the inlet end of the outfeed conduit 52, thence through conduits 58 and 62 to a storage barrel. The heavier water fraction of the distillate gravitates downward in the container, and excess water thus introduced to the container is drawn off continuously through the overflow pipes 72 and 74 and outlet discharge pipe 76.

The intermediate portion of outflow pipe 72 adjacent the apex 22 of the trough 20 functions in the manner of a heat exchanger to minimize the temperature differential between the hotter liquid entering the trough through the infeed conduit 30 and the cooler liquid entering the overflow pipe 72. This contributes advantageously toward minimizing fluctuations in the level of the interface 70 during separation.

Because of the large size of the trough 20, it is easily capable of handling the maximum output of the steam distillation apparatus. Moreover, because of the large capacity of liquid under the trough, the liquid is maintained in a substantially quiescent state, whereby to achieve separation with maximum efficiency.

In the event air or other volatile materials are entrapped in the condensate delivered to the funnel 38, such entrapped gases collect adjacent the upper inclined wall 34 of the settling tank and gravitate upward along it to the gas relief conduit 50 which exhausts them to the atmosphere.

After steam distillation of a batch of mint plant has continued for a time, it may be desired to determine the rate of production to ascertain whether the steam distillation should be discontinued. This is accomplished in the following manner: Some of the mixture progressing through the tank 32 also will rise in the transparent tubing 40, where the lighter density oil will collect on top of the water. The operator blows through the constricted orifice 42 in the cap 44 to cause the column of oil and water to be expelled from the tube and into the flow passing downward through the infeed conduit 30. Upon removal of the blowdown pressure, water first fills the transparent tube to the establish level, after which the lighter density oil begins to accumulate above the water. By measuring the time required to accumulate in the tubing 40 an oil column of predetermined height, the operator thus is able to determine the rate of oil production at the distillation apparatus. By this means the operator is able to determine when the rate of oil production reaches an economic minimum, whereupon the distillation process is terminated.

Referring now to the embodiment illustrated in FIGS. 4-6, this separator differs from a separator previously described primarily by housing the inverted collecting trough, defined by the angular top wall 20' and vertical sidewalls 16' and 18', within a container 90 rather than utilizing the trough to form the closed top of a container. The trough is inclined angularly across the inside of the container and its opposite ends are closed. In the embodiment illustrated, the end closures are provided by welding the ends of the trough to the front and rear end walls of the container. The sidewalls of the trough are spaced inwardly from the adjacent sidewalls of the container, as best shown in FIG. 6. The bottom of the trough is open, as will be understood.

The inlet end of the infeed conduit 30 communicates through the front wall of the container 90 with the lower end of the trough 20'. The inlet end of the outfeed conduit 52' communicates through the rear wall of the container 90 with the interior of the trough 20' adjacent the upper end of the latter. The outfeed conduit extends upwardly and is provided adjacent its open upper end with an outlet fitting 60' to which is attached elongated discharge pipe 62'. The liquid level interface-monitoring tube 80' communicates at its lower end with the interior of the container 90 below the trough 20' and at its upper end with the outfeed conduit 52' above the inlet end thereof.

The telescoping overflow pipes 72' and 74' are coupled together for longitudinal adjustment by the clamping collar seal 78', for adjusting the elevation of the discharge pipe 76' and hence the maximum level 92 of liquid in the container 90.

This adjustment effects proportionate adjustment of the level of the interface 70', as previously described. The inlet end of the lower discharge pipe 72' communicates through the sidewall of the container 90 adjacent the bottom thereof. The top of the container 90 is open.

In the operation of the separator illustrated in FIGS. 4-6, the container 90 first is filled with water to the level 92 established by the preselected level of the discharge pipe 76'. Condensate then is admitted into the funnel 38 whence it progresses to the lower end of the collecting receptacle trough 20'. The lighter density oil fraction is trapped under the closed top of the trough and gravitates upwardly through the inlet end of the outfeed conduit 52' and thence through conduit 62' to a storage barrel. The heavier water fraction of the distillate gravitates downward and enters the container 90 from under the sides 16' and 18' of the trough. The excess water thus introduced into the container 90 is drawn off continuously through the overflow outlet discharge pipe 76'. Visual inspection of the level of the interface 70' in the transparent tube 80', and appropriate adjustment of the elevation of the discharge pipe 76', will insure that the interface not move upwardly to approach the inlet end of the outfeed conduit 52' nor move downward to approach the lower edge of the trough, in the manner previously explained.

It will be apparent that the overflow pipe assembly illustrated in FIGS. 4-6 may be replaced by a laterally extending pipe fitted with an adjustable pressure-sensitive valve of well-known construction which functions to control the maximum level 92 of liquid in the container 90. The arrangement illustrated is preferred for its simplicity and reliability.

From the foregoing it will be appreciated that the present invention provides a separator of simplified and economical construction and which operates automatically to separate immiscible liquids with maximum efficiency and high production rate.

It will be apparent to those skilled in the art that various changes may be made in the size, shape, type, and arrangement of parts described hereinbefore without departing from the spirit of this invention.

Having now described my invention and the manner in which it may be used, I claim:

1. A separator for immiscible liquids of different densities, comprising
   a. a container adapted to contain the heavier liquid of immiscible liquids,
   b. an elongated collecting receptacle in the container open at its bottom and having a closed top spaced above the bottom of the container and inclined transversely of the container for collecting the lighter liquid against said closed top for movement of said lighter liquid from the lower end of the inclined top transversely to the upper end thereof,
   c. immiscible liquid infeed conduit means having an upper inlet end and a lower outlet end communicating with the collecting receptacle adjacent the lower end of the inclined top thereof,
   d. lighter liquid outfeed conduit means having an upper outlet end disposed below the inlet end of the infeed conduit means and a lower inlet end communicating with the upper end of the inclined top of the collecting receptacle transversely of the outlet end of the infeed conduit means, and
   e. heavier liquid overflow conduit means having an inlet end communicating with the container adjacent the bottom thereof and including outlet means positioned to establish the maximum level of heavier liquid in the separator at a level below the maximum level of lighter liquid in the outfeed conduit means and the level of the interface between immiscible liquids at a level below the inlet end of the outfeed conduit means.

2. The separator of claim 1 wherein the collecting receptacle comprises the top wall of the container.

3. The separator of claim 1 wherein the collecting receptacle is mounted within the container intermediate the top and bottom ends thereof and has an opening at its bottom side.

4. The separator of claim 1 wherein the overflow conduit means includes a portion extending upwardly through a portion of the outfeed conduit means and is sealed therefrom.

5. The separator of claim 1 wherein an intermediate portion of the overflow conduit means extends along the inclined top of the collecting receptacle.

6. The separator of claim 1 including
   a. a settling tank external of the container communicating at its bottom end with the infeed conduit means below the maximum level of liquid in the separator,
   b. liquid delivery conduit means communicating at its lower end with the settling tank laterally of the infeed conduit means and extending above said outlet means for establishing maximum level of liquid in the separator, the upper wall of the settling tank being inclined upwardly from the end adjacent the liquid delivery conduit means to the end adjacent the infeed conduit means, and
   c. liquid feed rate monitoring means comprising an elongated transparent tube communicating at its lower end with the upper end of the settling tank adjacent the infeed conduit means and below said maximum level of liquid in the separator and at its upper end with the atmosphere above said maximum level of liquid in the separator.

7. The separator of claim 6 including vertical baffle means in the settling tank positioned between the infeed conduit means and the liquid delivery conduit means and terminating at its upper end below the upper wall of the tank.

8. The separator of claim 6 including gas vent conduit means communicating at it slower end with the upper side of the settling tank and at its upper end with the atmosphere above said maximum level of liquid in the separator.

9. In a separator for immiscible liquids of different densities including a container adapted to contain the heavier liquid of immiscible liquids, infeed conduit means for delivering to the container immiscible liquids to be separated, lighter liquid outfeed conduit means communicating with the container for removing the lighter liquid therefrom, and heavier liquid overflow conduit means having an inlet end communicating with the container adjacent the bottom thereof and including outlet means positioned to establish the maximum level of heavier liquid in the separator at a level below the maximum level of lighter liquid in the outfeed conduit means and the level of the interface between immiscible liquids at a level below the inlet end of the outfeed conduit means, the combination therewith of
   a. a settling tank external of the container communicating at its bottom end with the infeed conduit means below the maximum level of liquid in the container,
   b. liquid delivery conduit means communicating at its lower end with the settling tank laterally of the infeed conduit means and extending above said outlet means for establishing maximum level of liquid in the container, the upper wall of the settling tank being inclined upwardly from the end adjacent the liquid delivery conduit means to the end adjacent the infeed conduit means, and
   c. liquid feed rate monitoring means comprising an elongated transparent tube communicating at its lower end with the upper end of the settling tank adjacent the infeed conduit means and below said maximum level of liquid in the separator and at its upper end with the atmosphere above said maximum level of liquid in the separator.

10. The combination of claim 9 including vertical baffle means in the settling tank positioned between the infeed conduit means and the liquid delivery conduit means and terminating at its upper end below the upper wall of the tank.

11. The combination of claim 9 including gas vent conduit means communicating at its lower end with the upper side of the settling tank and at its upper end with the atmosphere above said maximum level of liquid in the container.

12. A separator for immiscible liquids of different densities, comprising a. a container adapted to contain the heavier liquid of immiscible liquids,
b. heavier liquid overflow conduit means having an inlet end communicating with the container adjacent the bottom thereof and including outlet means positioned to establish the maximum level of heavier liquid in the separator and the level of the interface between immiscible liquids in the container,
c. an elongated collecting receptacle associated with the container and having a closed top spaced above the bottom of the container,
d. lighter liquid outfeed conduit means having an inlet end communicating with the receptacle adjacent the top thereof,
e. immiscible liquid infeed conduit means having an outlet end communicating with the receptacle laterally of the inlet end of the outfeed conduit means,
f. the collecting receptacle comprising an inverted trough extending across the container and mounted with its closed top inclined upwardly from the outlet end of the infeed conduit means to the inlet end of the outfeed conduit means,
g. liquid interface level monitoring means comprising an elongated transparent tube communicating at its lower end with the container below the inlet end of the outfeed conduit means and at its upper end with the outfeed means above the inlet end of the latter, and
h. liquid feed rate monitoring means comprising an elongated transparent tube communicating at its lower end with the infeed conduit means below the maximum level of liquid in the separator and at its upper end with the atmosphere above said outlet means for establishing maximum level of liquid in the separator.

13. A separator for immiscible liquids of different densities, comprising
a. a container having a bottom wall, a peripheral wall and a transversely inclined top wall of inverted trough shape forming an elongated collecting receptacle,
b. immiscible liquid infeed conduit means having an upper inlet end and a lower outlet end communicating with the container adjacent the lower end of said inclined top wall,
c. lighter liquid outfeed conduit means having an upper outlet end disposed below the inlet end of the infeed conduit means and a lower inlet end communicating with the container at the upper end of said inclined top wall, and
d. heavier liquid overflow conduit means having a lower inlet end communicating with the container adjacent the bottom thereof and including a vertically adjustable upper end portion having an outlet positioned below the outlet end of the lighter liquid outfeed conduit means to establish the maximum level of heavier liquid in the separator at a level below the maximum level of lighter liquid in the outfeed conduit means and the level of the interface between immiscible liquids at a level below the inlet end of the outfeed conduit means.

14. The separator of claim 13 including
a. a settling tank external of the container communicating at its bottom and with the infeed conduit means below the maximum level of liquid in the separator,
b. liquid delivery conduit means communicating at its lower end with the settling tank laterally of the infeed conduit means and extending above the outlet of the vertically adjustable upper end portion of the overflow conduit means, the upper wall of the settling tank being inclined upwardly from the end adjacent the liquid delivery conduit means to the end adjacent the infeed conduit means, and
c. liquid feed rate monitoring means comprising an elongated transparent tube communicating at its lower end with the upper end of the settling tank adjacent the infeed conduit means and below the maximum level of liquid in the separator and at its upper end with the atmosphere above said maximum level of liquid in the separator.

* * * * *